Nov. 22, 1927.  1,650,396
F. J. STRAUB ET AL
GEAR SHIFTING MECHANISM FOR MOTOR VEHICLES
Filed Oct. 5, 1926  4 Sheets-Sheet 1

Inventors
Francis J. Straub
Joseph T. Weinzierl
by C. M. Clarke
Attorney

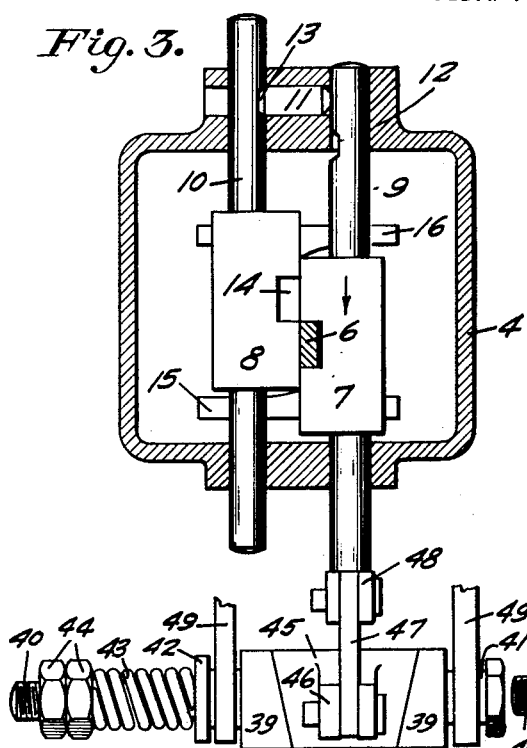

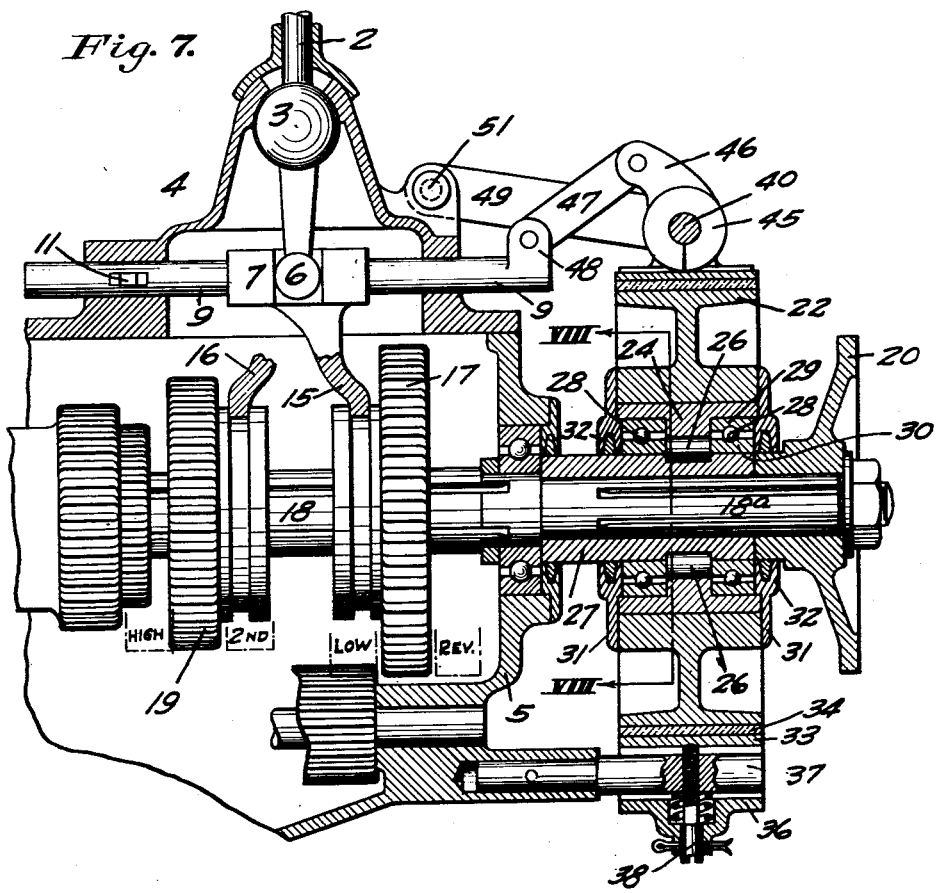
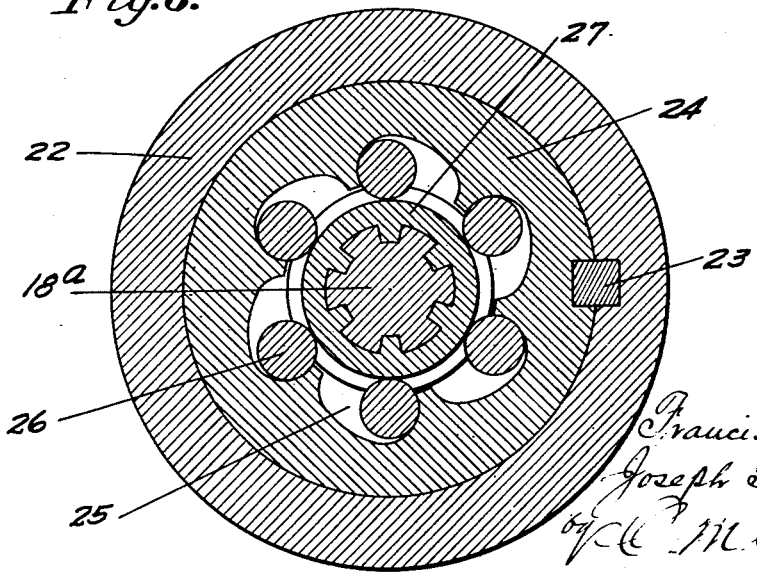

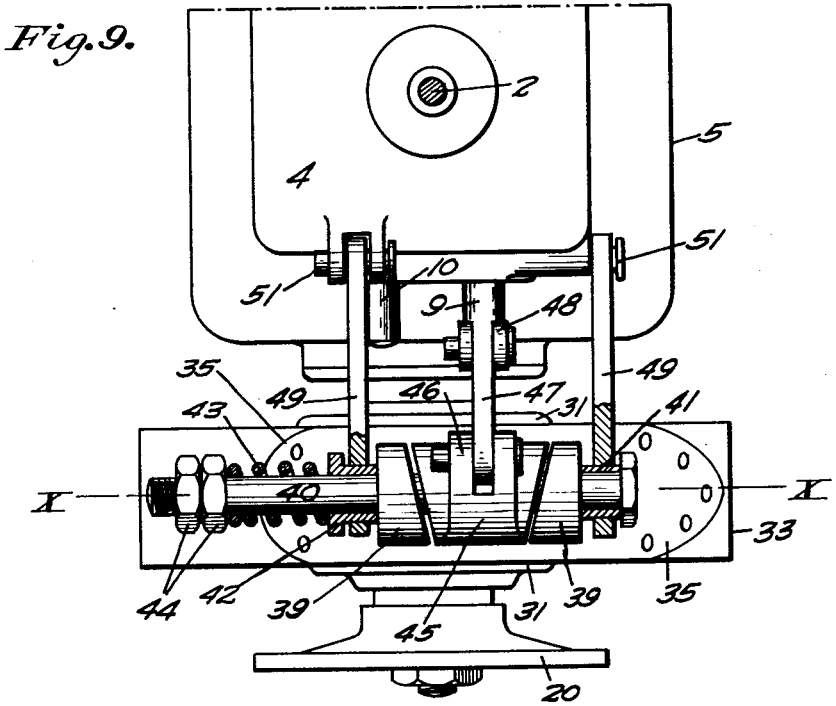
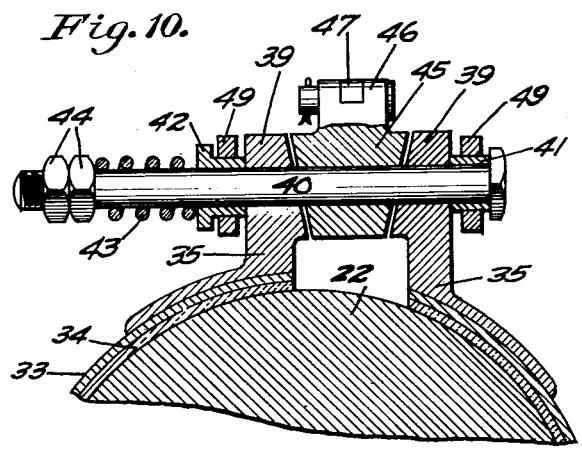

Patented Nov. 22, 1927.

1,650,396

UNITED STATES PATENT OFFICE.

FRANCIS J. STRAUB AND JOSEPH T. WEINZIERL, OF NEW KENSINGTON, PENNSYLVANIA.

GEAR-SHIFTING MECHANISM FOR MOTOR VEHICLES.

Application filed October 5, 1926. Serial No. 139,616.

Our invention relates to an improvement in gear shifting mechanism for motor driven vehicles, and has for its object to provide means for the prevention of undesirable back movement or travel of the vehicle under gravity.

Ordinarily, when such a vehicle as an automobile becomes stalled on a hill, or is being started up grade from a stationary position, it is difficult to promptly shift the gears without, at the same time, utilizing the ordinary brake equipment, requiring considerable skill and experience for successively obviating the gravity tendency and for smoothly imparting driving power from the engine to the gears.

Our invention contemplates the application to the usual or standard gear shift and secondary drive shaft, coupled with the engine through its clutch mechanism, of automatically operative interlocking means subject to the control of a supplemental brake operatively connected with and controlled by the gear shift mechanism, to act to hold the car against reverse or back movement when the transmission is in either neutral, low, second, or high gear positions.

Ordinarily, when a motor vehicle is stopped on an up grade, starting is made difficult by the necessity of releasing the brakes at the same time the engine picks up the load when the clutch is thrown in. Unless the driver is experienced and careful, an accident may occur if the vehicle gets beyond control and descends the grade backwardly.

The prevention device of this application permits free forward movement of the vehicle, but checks automatically any such backward movement. Likewise, in the case of an engine stalling in an attempt to start the vehicle, such undesired backward movement is prevented by the device engaging or becoming operative upon an initial backward movement.

By interlinking or connecting the controlling mechanism with the usual gear shifting lever, the device becomes automatically inoperative when it is desired to reverse the vehicle, and again operative when the gear shifting lever is in any other position than reverse.

Incidentally, when the mechanism is interconnected with the gear lever, a limited degree of extra pressure is required on the lever to shift into reverse. Such resistance is a matter of no great inconvenience and is useful in tending to act as a warning to the operator to prevent him from shifting into reverse instead of second gear.

In the accompanying drawings, showing certain preferred embodiments of the invention:

Fig. 3 is a similar view, showing the gear shift in reverse;

Fig. 4 is a similar view, showing the gear shift in low gear position;

Fig. 5 is a similar view, showing the gear shift in second forward position;

Fig. 6 is a similar view, showing the gear shift in high gear position;

Fig. 7 is a central vertical sectional view through the rear end of the transmission case on the line VII—VII of Fig. 1;

Fig. 8 is an enlarged cross-section on the line VIII—VIII of Fig. 7;

Fig. 9 is a plan view of the construction shown in Fig. 7, partly broken away, in the neutral position of Fig. 1;

Fig. 10 is a partial vertical section on the line X—X of Fig. 9.

Referring to Figs. 1 to 6 inclusive, 2 is the usual standard gear shift lever mounted by its spherical bearing 3 in the supporting casing or housing 4, above the usual transmission casing 5.

Figure 1:
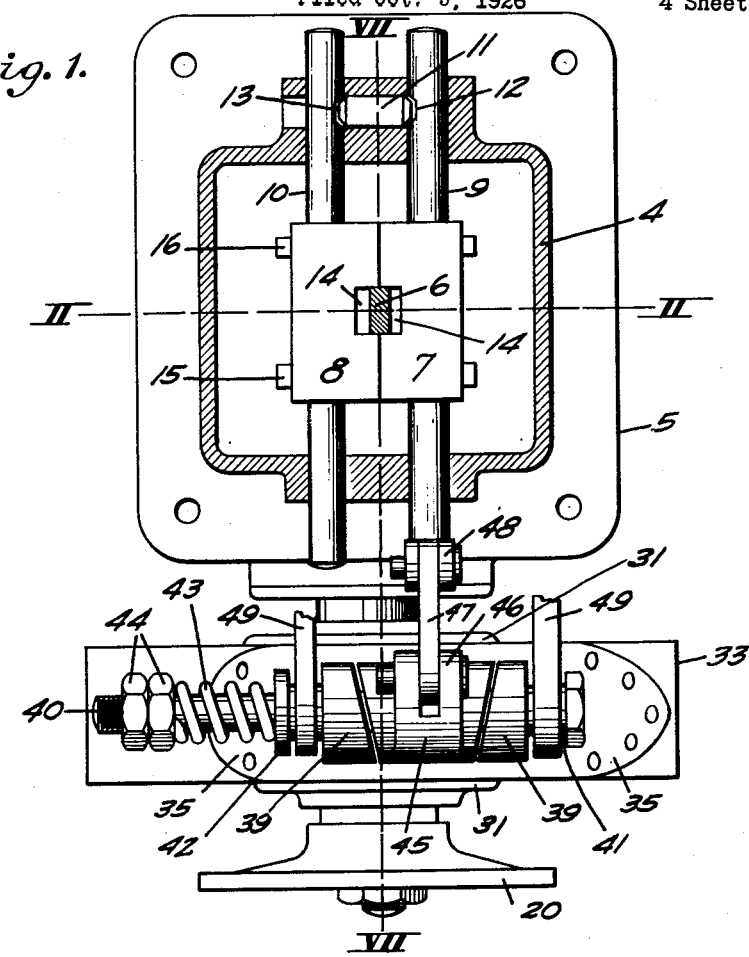
Fig. 1 is a diagrammatic plan view, showing the gear shift mechanism in operative connection with the brake-controlled interlocking mechanism, in neutral position.
Figure 2:
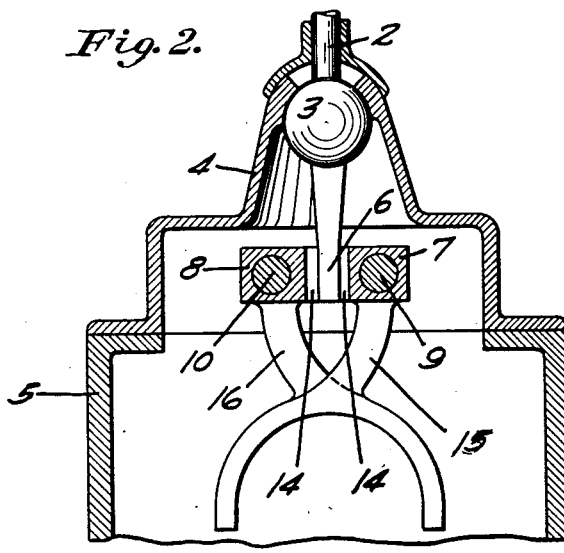
Fig. 2 is a cross sectional detail view, on the line II—II of Fig. 1.

As is generally understood and practiced, such construction provides for an non-operative or neutral position of lever 2, as in Figs. 1 and 2.

An extension 6 of lever 2 extends downwardly between the usual shifting blocks or forks 7 and 8, secured in any suitable manner, as by a cross pin, to the shifting rods 9 and 10 respectively, slidably mounted in the end portions of the base of casing 4.

An interlocking key 11, beveled at opposite ends, engages corresponding sockets 12 and 13 in rods 9 and 10 respectively, so as to hold one of said rods against movement when the other is shifted. Key 11 is forced into locking engagement with the other rod, when either is shifted, as is common practice, holding such other rod against movement until the active rod is returned to neutral position. In such neutral position, Fig. 1, the terminal 6 of the shift lever is half way between the blocks 7 and 8, each of which blocks is provided with a recess 14 of a depth sufficient to receive the full width of terminal 6 when shifted to the right or left.

By such construction, the upper end of the lever may be thrown to the left, with corresponding thrusting of the terminal 6 to the right, and by forward movement of the handle of the lever, block 7 will be thrown rearwardly for reverse, as in Fig. 3. In the same lateral position and with a reverse direction or backward movement of the hand lever, block 7 will be thrust forwardly for low gear engagement, as in Fig. 4.

Upon coming again to neutral, the hand lever being thrown to the right will engage socket 14 of block 8, and forward movement of the hand lever will thrust said block backwardly for second gear engagement, as in Fig. 5, with accomplishment of high gear position by reversal of the hand lever backwardly, as in Fig. 6.

Each of said blocks 7 and 8 is provided with a downwardly extending gear shifting arm 15 and 16 respectively.

Fork 15 of block 7 operates to shift gear 17 of secondary shaft 18 from neutral, forward into low gear or backward into reverse gear positions, as indicated in dotted lines, Fig. 7.

Likewise fork 16 of block 8 operates to shift gear 19 from neutral position backward into second gear and forward into high gear positions, as indicated.

It will be understood that secondary shaft 18 of the transmission is fluted and in driving engagement with shift gear 17 by the usual keyways, and operates when thrust into gear engagement with the usual countershaft gears as generally understood, without further necessary description.

At the end of shaft 18 is the usual universal joint flange 20 for coupling connection with the propeller shaft, for rear axle drive connection.

The gear shift or transmission mechanism above described is within the interior of the usual transmission case 5, beyond which extends the secondary shaft extension 18$^a$, upon which is mounted the brake drum 22 and its co-operating mechanism for effecting the functions of the invention, as controlled by the gear shift mechanism.

It will be understood that with the gears in neutral unless the usual foot brake or emergency brake is applied, gravity will effect reverse movement of secondary shaft 18 and 18$^a$ in backing down hill.

It is the purpose of the present invention to provide means for automatically checking and holding the secondary shaft against such gravity-induced reverse movement under all conditions not controlled by the usual brakes until the transmission is in low or other gear moving forward and independent of the reverse gear position and movement.

The mechanism is therefore designed to hold the car against backward movement on grades until its commences to move forward, and to be inoperative during ordinary backing.

This is accomplished by means of the brake drum 22, normally gripped by a spring-tightened band in all positions except reverse, and acting through interlocking mechanism between the brake drum and shaft extension 18$^a$ to prevent its reversal under the conditions mentioned.

Fixedly mounted in the hub of the drum 22, either by a binding fit or by key 23, is a bushing 24 having an inner annular series of roller sockets 25. These are of well known construction, providing a rising or binding face at one end and a widening or releasing cavity at the other, annularly of the bushing, for reception of a series of co-acting rollers 26.

Opposing said rollers, and providing an annular concentric bearing therefor, is a sleeve or bushing 27 fixedly mounted upon and forming a rotatable portion of shaft extension 18$^a$, by spline connection therewith, as in Fig. 8. Sleeve 27 is preferably recessed to receive the rollers 26 and assist in retaining them in true annular relation, holding the whole assembly against endwise shifting.

Annular ball or roller bearings 28 are preferably arranged at each side of the series of binding rollers 26, mounted in suitable bearing rings 29, 30, of bushing 24 and sleeve 27 respectively. Cover plates 31 carrying oil retaining washers 32 are placed at each end of the drum hub, holding the roller bearings in position.

As thus arranged, shafts 18 and 18$^a$ are free to rotate in the usual direction, but will be immediately locked upon reverse movement, assuming the drum 22 is held against rotation.

When drum 22 is released it is in a floating condition, so that the interlocking rollers 26 may function without acting to effect a braking control on the car.

For the purpose of either holding or releasing the brake drum 22 under the conditions of operation, providing for free or locked condition of the shaft as desired, a brake band 33 having a lining 34 surrounds the drum, terminating in tightening and loosening lugs 35.

At its lower middle portion the brake band is provided with a socket 36 by which it is mounted on a projecting stud 37 extending from the transmission case 5, as in Fig. 7, and provided with a screw 38 for making vertical adjustments of the brake band and its lining with relation to the brake drum.

Lugs 35 are provided with inwardly confronting oppositely disposed cam-faced bearing portions 39 through which extends a tightening bolt 40. Bearing sleeves 41, 42, are located at each outer side of lugs 39, providing additional bearings for the bolt and for tightening spring 43 and its nuts 44 at one end. By adjustment of the nuts the tension tending to draw the lugs together to effect gripping action of the brake band may be accurately adjusted.

Between the cam faces of lugs 39 is an opening or spreading cam 45 rotatably mounted on bolt 40, as in Fig. 10. Cam 45 is provided with an actuating lever 46, adapted in neutral position to be free of engagement of the opposing cam faces of lugs 39, but on backward movement to wedge the lugs 39 apart, releasing the brake band. Such condition exists only in reverse, as in Fig. 3.

In all other positions, to-wit, neutral, low, second, and high, the spreading cam 45 is out of contact with the lugs and they are drawn together by spring 43.

Lever 46 is connected to shifting rod 9, controlling reverse and low gear engagement, by link 47 engaging the lugs of arm 46 and lugs 48 of rod 9, by a suitable pivoting pin connection, as in Fig. 7. Such link connection provides for gripping of the brake drum by the band in neutral position or any of the forward speeds, and for release of the drum when the shifting rod 9 is moved to reverse, as stated.

For the purpose of bracing the brake band mounting from the transmission case to prevent any forward or backward movement of the brake band, and to insure positive binding and releasing movement of the cam 45, links 49 are provided at each side of lugs 39, engaging collars 41 and 42 respectively.

Said links are anchored at their other ends between suitable lugs extending from the transmission cover plate 4, and connected by pins 51, as in Fig. 9.

The fitting connection of the links is free and flexible, while holding the brake mechanism in position under strain from any outward or inward movement under action of the spreading cam.

The operation of the device is as follows:

With lock nuts 44 adjusted and tightened to maintain the proper tension on spring 43, the drum 22 will be tightly gripped and held against rotation, until the lugs 39 are wedged apart.

Such gripping action is ample to effect interlocking engagement with shaft 18ᵃ upon any tendency to reverse movement, while also holding the vehicle when stationary and with the gears in neutral. If a shift is made into low gear, and the vehicle is started, the drum is maintained in clamped condition without rotation, but providing for proper advancing movement of shaft 18ᵃ and its sleeve 27.

Thus, rollers 26 may roll freely into the enlarged portions of pockets 25, and such conditions will continue during and after shifting into middle and high gear, and at all times when the vehicle is moving forward.

Should it be necessary, however, to stop the vehicle on an up grade, any slight reverse movement of it by gravitation, effecting reverse movement of shaft 18ᵃ, causes rollers 26 to wedge in their pockets, which are relatively stationary because of the brake band and its inserted bushing 24 being held against movement. Any slight movement of the drum within the band, as by possible slippage, will merely act to absorb possibly occurring shock.

If, now, after the vehicle has been prevented from reverse travel on an up grade, a shift is made into low gear, the operator needs only to operate the throttle and clutch in the usual way, with no attention whatever to the ordinary brakes, the mechanism effectively holding the car against reverse travel.

The same conditions continue through the subsequent forward gear shifts.

On the other hand, if the device is in operation, holding the car on an up grade, and it is desired to move it backward, the gear shift lever may be moved into reverse position, as in Fig. 3, releasing the brake band by spreading the cam lugs. The car will then back downwardly by gravity with the clutch out, or may be positively backed in the usual way, until the gear is shifted into neutral, when the brake band will again become effective.

In the construction illustrated and above described, the invention is shown as incorporated with the transmission of a motor vehicle. It may also be applied to the pinion shaft of a gear drive axle, or the worm shaft of a worm drive axle, or fitted on one or both of the live axles with any driving mechanism. The application to the transmission mechanism, as shown, is herein selected because of the simplicity of the connections to the gear shift lever.

It will be understood, therefore, that it is entirely feasible to change or vary from the design and arrangement shown, as by the substitution of any other standard form of interlocking mechanism, or by the adoption of other changes or variations entirely within the province of the skilled mechanic, and all such are to be understood as included within the principle of the invention and the scope of the appended claims.

We claim:

1. The combination with the transmission of a motor driven vehicle including a shaft provided with shifting gears, and means for shifting said gears, of a drum, a plurality of wedging rollers for interlocking the drum and shaft, and means for locking and unlocking the drum connected with the gear shifting means.

2. The combination with the transmission of a motor driven vehicle including a shaft provided with shifting gears, and a gear shifting rod, of a drum surrounding the shaft, rollers for interlocking the drum and shaft, and means for locking and unlocking the drum connected with the gear shifting rod.

3. In change speed mechanism for motor vehicles, a power imparting shaft having a shifting gear, a slide rod therefor, a member surrounding the shaft, means between the shaft and said member for effecting an interlock therebetween when said member is held, and means connected with the slide rod for holding said member.

4. In change speed mechanism for motor vehicles, a power imparting shaft having a shifting gear, a slide rod therefor, a brake drum surrounding the shaft, releasable binding mechanism between the shaft and drum, a brake band surrounding the drum, means for tightening the brake band, and means connected with the slide rod for loosening the brake band.

5. In change speed mechanism for motor vehicles, a power imparting shaft having a shifting gear, means for shifting the gear, a member surrounding the shaft, means between the shaft and said member for effecting an interlock therebetween when said member is held, and means connected with the gear shifting means for holding said member.

6. In change speed mechanism for motor vehicles, a power imparting shaft having a shifting gear, means for shifting the gear, a brake drum surrounding the shaft, releasable binding mechanism between the shaft and drum, a brake band surrounding the drum, means for tightening the brake band, and means connected with the gear shifting means for loosening the brake band.

7. In change speed mechanism for motor vehicles, a power imparting shaft having a shifting gear, means for shifting the gear, a brake drum surrounding the shaft having a series of locking and unlocking rollers and sockets therefor operable to grip the shaft in one direction and to release it in the opposite direction, a brake band surrounding the drum having spring contracted terminals, and means connected with the gear shifting means for expanding the brake band.

8. In change speed mechanism for motor vehicles, a power imparting shaft having a shifting gear, means for shifting the gear, a brake drum surrounding the shaft having a series of locking and unlocking rollers and sockets therefor operable to grip the shaft in one direction and to release it in the opposite direction, a brake band surrounding the drum having spring contracted terminals, and wedge mechanism connected with the gear shifting means for separating the terminals and loosening the brake band.

In testimony whereof we hereunto affix our signatures.

FRANCIS J. STRAUB.
JOSEPH T. WEINZIERL.